UNITED STATES PATENT OFFICE.

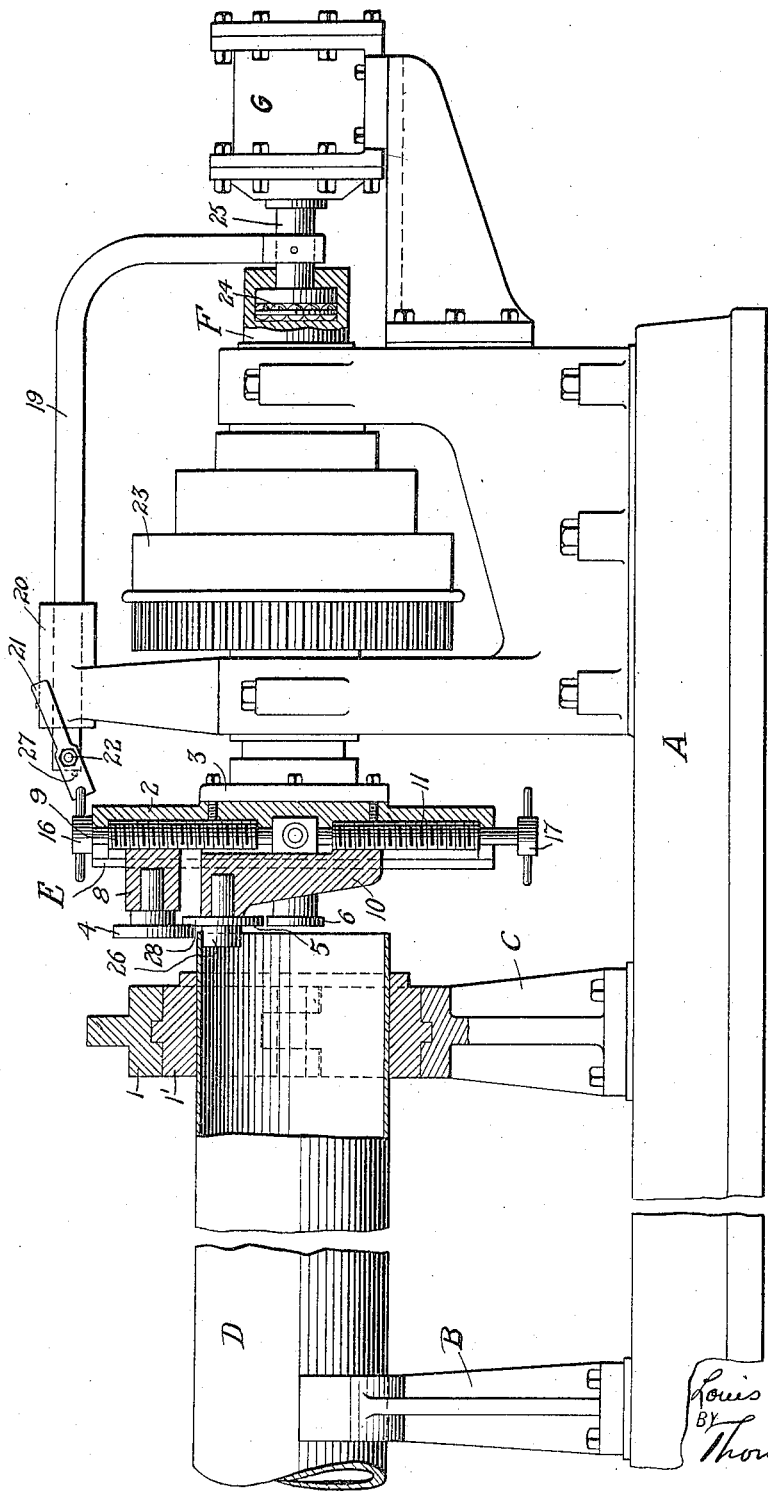

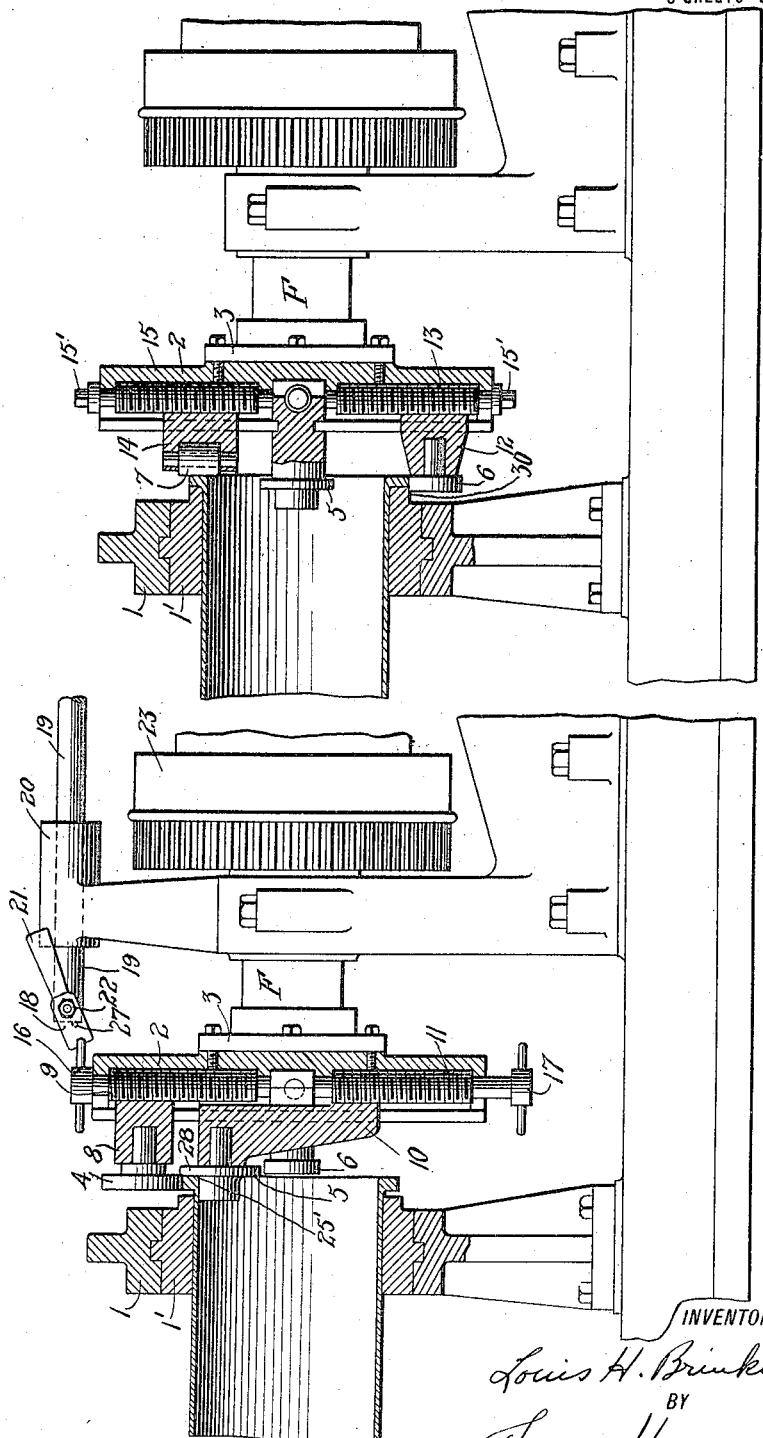

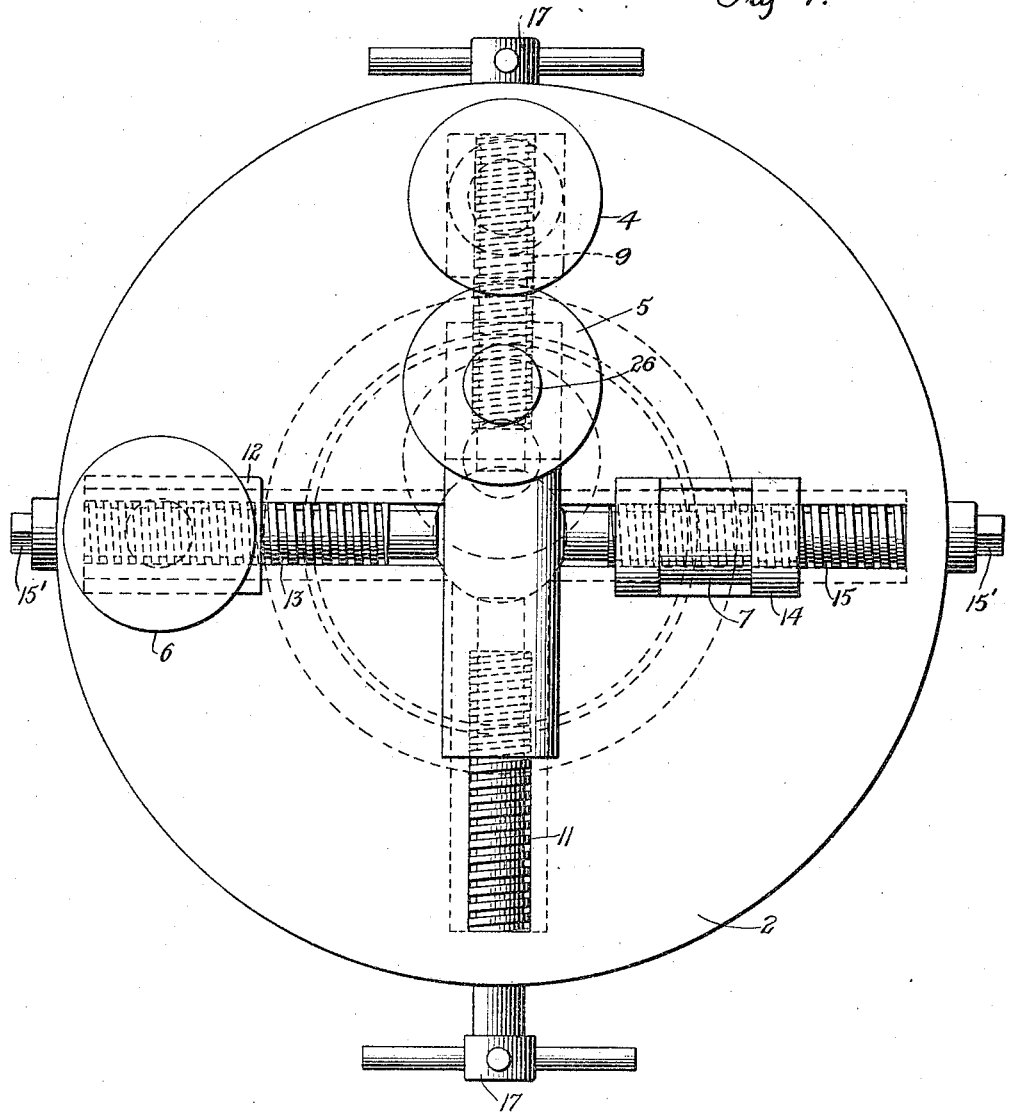

LOUIS H. BRINKMAN, OF GLEN RIDGE, NEW JERSEY, ASSIGNOR TO GENERAL INDUSTRIES COMPANY, A CORPORATION OF NEW YORK.

METHOD FOR MAKING FLANGED PIPES.

1,304,939.  Specification of Letters Patent.  Patented May 27, 1919.

Original application filed November 15, 1916, Serial No. 131,374. Divided and this application filed April 11, 1917. Serial No. 161,105.

*To all whom it may concern:*

Be it known that I, LOUIS H. BRINKMAN, a citizen of the United States, residing at Glen Ridge, county of Essex, State of New Jersey, have invented new and useful Improvements in Methods for Making Flanged Pipes, of which the following is a specification.

This invention relates to methods for forming flanges upon pipes by turning them up from the body of the pipe.

This application is a division of my application Serial Number 131,374—filed November 15th, 1916.

Ordinarily where a flange is turned up from the body of a pipe the outer edge of the flange is thinner than where it joins the pipe and the greater the radial width of the flange the greater is the difference in thickness between the inside and the outside edges of the flange. This variation in thickness of the flange produces difficulty when the pipes are to be secured together, in that sloping, instead of squarely radial, surfaces are presented for the bearing surfaces of nuts and rivets. Also this tapering section of the flange causes decrease in strength thereof as the rim of the flange is approached and other disadvantages present themselves.

A most important feature of disadvantage of a flange as ordinarily turned up from the pipe is that the metal is left in a disadvantageous molecular condition so that the strength of the flange is reduced and is rendered unreliable. The operation of forming the flange causes the metal to become stratified and in some cases cracks may even be developed, the metal not having that homogeneous structure which is conducive to reliability and strength.

In order to reinforce and square up the flange of tapering section referred to, auxiliary metal pieces have been applied but this is an unsatisfactory and unsightly expedient. If attempt is made to upset the flange after it has been completed, very heavy apparatus and power would be required, and even then it would be practically impossible to upset to a sufficient extent to produce the desired results and in any event the flange would almost surely buckle. It is also impracticable to produce the desired results by first performing the upsetting or metal thickening operation on the cylindrical body of the pipe and then turning up the thickened portion to form the flange. In the first place it would be practically impossible, even with great power and heavy machinery, to upset the pipe body to the desired extent. Furthermore the rim of the flange would thin out as it was turned up so that the purpose of thickening the metal would be largely defeated.

According to the present invention the flange metal is not thickened or upset in its entirety either before or after the flange is turned up, but the thickening takes place gradually as the metal is turned outwardly to form the flange. This may be accomplished by retarding the metal as it is turned outwardly, to such a degree that the metal is thickened to the desired extent, the flange metal being permitted to move outwardly as the desired thickening takes place.

Other objects and objects ancillary to the above will appear hereinafter.

In the accompanying drawings which illustrate the invention: —

Figure 1 is a side elevation, partially in section, of an apparatus for flanging pipes, said apparatus being in position for initiating the flanging operation.

Fig. 2 is a view similar to Fig. 1 showing the chuck carrying the devices for forming and operating upon the flange with appurtenant parts, and showing a pipe with the flange partially formed.

Fig. 3 is a view similar to Fig. 2 showing the facing and sizing rolls for the flange in the operation of finishing the flange, and Fig. 4 is an enlarged face view of the chuck.

Referring to the drawings the apparatus comprises a base plate A on which are mounted suitable supports as B and C for a pipe D to be flanged. The flanging devices are mounted in a chuck E secured to a rotating shaft F which may be moved endwise by any suitable means as a hydraulic cylinder G.

Having thus generally indicated the apparatus shown in the drawings, it will now be referred to in detail. The pipe D may be secured in fixed position by a hinged clamping ring 1, having a removable bushing 1', adapted to grip and immovably hold the pipe D. Bushings of different sizes may be employed at different times to accommodate pipes of different sizes. The chuck E comprises a plate 2 bolted to the flange 3 fixed to the driving shaft F. This chuck carries the upsetting roll 4, the flanging roll 5, the sizing roll 6 and the facing roll 7. The upsetting roll 4 is rotatably mounted in the head 8 which is movable radially of the chuck in suitable guides by means of a screw 9 engaging with the block 8, the screw being rotatably mounted, but being prevented from moving endwise. The flanging roll 5 is rotatably mounted in a radial line with the upsetting roll in a block 10 movable radially of the chuck in suitable guides by means of the screw 11 which engages with the block. This screw is also rotatably mounted but secured against endwise movement. The sizing roll 6 is rotatably mounted in a block 12 movable radially of the chuck in suitable guides by the turning of the screw 13 which may be rotated but not moved endwise. The facing roll 7 is rotatably mounted in the block 14 which is movable radially of the chuck in suitable guides by the turning of the screw 15 which is in screw threaded engagement with the block 14 and may be turned but is mounted to prevent endwise movement. The outer ends of the screws 9 and 11 are provided with turnstile heads 16 and 17, the cross bars of which may engage a tappet 18 which is pivotally mounted upon the end of a bar sliding in the support 20. By means of the handle 21 the tappet may be rocked on its pivot 22 so as to be moved into the paths of the turnstile arms, or removed therefrom at will. This arrangement provides for the automatic adjustment of the upsetting and flanging rolls during the operation of the machine. The chuck may be rotated from a cone pulley 23 which is splined on the shaft F so that it rotates with the shaft but may move axially thereon. This permits the chuck to be moved along the axis of the pipe by any suitable means such as the hydraulic cylinder G the operation of which to produce pressure at will is well known so that the connections for controlling the fluid pressure are not illustrated in detail. An endwise thrust is imparted to the shaft F by means of a thrust coupling 24 which permits relative rotation of the shaft and piston rod 25 of the hydraulic cylinder. In order that the tappet 18 may be maintained in proper relation to the turnstile heads as the chuck is moved back and forth, the bar 19 is secured to the piston rod 25 so that the tappet moves back and forth with the chuck. The tappet is of sufficient width so that it will engage the crossbar a sufficient length of time to accomplish the desired movement.

Fig. 1 shows the apparatus in condition for beginning the flanging operation. The metal pipe D, usually heated, is secured in the clamp 1. The flanging roll is adjusted so that its cylindrical surface 26 is in contact with the interior of the pipe and the upsetting roll 4 is adjusted to the desired radial position of the chuck by means of the respective adjusting screws. The tappet 18 is thrown into the lowermost position as shown, in which it is limited by a stop pin 27 on the tappet which engages with the end of the arm 19. It will be observed that the head 17 is at a greater distance from the axis of the chuck than the head 16 so that with the tappet set as just described it will not engage the turnstile arms of the head 17 for adjusting the flanging roll but will lie in the path of the similar arms of the head 16 for adjusting the upsetting roll. The facing roll 7, which has its axis radial of the chuck, does not vary its position with relation to the chuck during the flanging operation and is set to the desired position by means of its adjusting screw 15. This may be turned by applying a socket wrench to its squared end 15'. The sizing roll 6 is adapted to bear upon the periphery of the flange and is also fixed with relation to the chuck during a flanging operation. It is initially adjusted into the desired position by turning its adjusting screw 13 in a manner similar to that employed in connection with the facing roll screw.

The flanging roll having been adjusted to accord with the interior diameter of the pipe, and the sizing, facing and upsetting rolls having been adjusted as described, the operator adjusts the hydraulic controlling valves to permit the fluid to bleed from one side of the piston of the hydraulic cylinder. This applies an endwise thrust to the shaft F and the chuck is thrust slowly against the end of the pipe at a speed depending upon the rate of bleed. The chuck being meanwhile rotated, the end of the pipe will be deflected outwardly along the curved surface 25' between the cylindrical surface 26 and the vertical surface 28 of the flanging roll. The metal will then travel along the vertical face 28 until it comes in contact with the upsetting roll 4. The retarding thrust exerted by the upsetting roll as the metal is turned outwardly into the flange will knead and upset the metal, thereby thickening it to a suitable degree to form the flange desired. This treatment of the metal makes it homogeneous and prevents the development of cracks or stratification. In the apparatus shown the upsetting roll remains stationary until a cross-bar of its adjusting screw engages the tappet when the screw will be turned and the roll moved radially outward. The upset and thickened metal may then move outwardly under the action of the flanging roll until it again comes in contact with the upsetting roll when it will be again retarded, causing upsetting and thickening of the metal at the end of the pipe wall, this operation continuing until the tappet again turns the screw and moves the upsetting roll still farther outwardly. While but one tappet has been illustrated it will be understood that a number of tappets might be arranged about the chuck so that instead of having the upset roll moved outwardly once per revolution, it might be moved a number of times in each revolution or it might be so arranged that the adjusting screw would be continuously turned at a slow rate so that the upsetting roll would be continuously but slowly moved outwardly. The amount of metal turned up by the flanging roll in a given time depends upon the amount of its movement axially of the pipe in a given time and therefore upon the rate of bleed of the hydraulic cylinder. This metal must find space either in outward movement or by thickening. When therefore it is regarded by the upsetting roll it must thicken and the greater the retardation the greater will be the thickening. The amount of thickening or upsetting of the metal therefore depends upon the frequency and extent or rate of outward movement of the upsetting roll with relation to the axial movement of the flanging roll. By proper adjustment of these movements the flange may be made of any thickness desired. It may also be made of any radial extent or height desired by continuing the operation as described as long as may be necessary. This is regardless of the thickness of the metal of the pipe, because, whatever this thickness, the metal is accumulated from the body of the pipe to the desired extent, and further this can be successfully accomplished to any desired degree without the use of excessively heavy power or apparatus because the upsetting or thickening action operates at any given time upon only a small portion of the flange metal, which having been brought to the desired condition is turned up into the flange and the operation is directed against a succeeding section of the pipe wall so that it is unnecessary at any time to operate through the whole body of the metal of the flange as is required in flanging operations previously referred to.

It will be observed that the first metal turned up forms the outermost while the last turned up forms the innermost portion of the flange, intermediate portions being successively turned up between these two extremes. As the section of the metal moves outwardly it must cover a larger area and consequently becomes thinner. The metal of the outermost part of the flange, i. e., that first turned up from the pipe, is subjected to this action to the greatest extent while the metal lying at the innermost part of the flange is practically free from it, intermediate flange portions being affected according to their distances from the pipe. To produce a flange of uniform thickness therefore the flange metal must be made thicker at the start than the flange is to be, this excess of thickness depending upon the radial position in the flange which the metal is to occupy. Thus the metal first turned up is so thickened that when it reaches the outermost portion of the flange and has been thinned accordingly, it will give the desired flange thickness. Flange metal for the intermediate portions will be excessively thickened but to a less degree as the inner side of the flange is approached, the metal at the inner edge being of the desired thickness of flange without any excess. This gradual variation of the thickening of the flange metal from a maximum at the beginning to a minimum at the end may be accomplished by varying the speed at which the chuck moves toward the pipe, the thickening depending upon the ratio of the axial speed of the chuck to the radial speed of the upsetting roll as before stated. The variations in speed of the chuck may be effected by regulating the amount of bleed from the hydraulic cylinder. If this is made sufficient at the start to produce the desired thickening it may be gradually reduced as the chuck progresses so that the speed of the chuck and thickening of the flange metal is reduced. By suitably controlling the cylinder and also the upsetting roll, the flange may be made to vary in thickness in any desired manner as well as of uniform thickness.

The flange having been built up to the desired height the bleed from the hydraulic cylinder is stopped which stops the axial movement of the chuck and it will be held stationary as regards axial movement although it continues to rotate. The tappet is then moved out of the path of the arms of the head 16 into the path of the arms of the head 17 when the rotation of the chuck will effect the turning of the screw 11 and the retraction of the flanging roll radially inward to a position as shown in Fig. 3. The chuck is then again thrust axially toward the end of the pipe when the facing roll 7 comes against the outer face of the flange while the sizing roll 6 is brought into position to bear upon the periphery of the flange. The facing roll being forced against the flange by a suitable pressure exerted by the hydraulic cylinder, the flange face will be suitably finished leaving it smooth and substantially radial while the back of the flange bearing against the bushing will be substantially parallel to the outer face. The sizing roll will roll down the periphery of the flange smooth and of the desired size. This sizing roll preferably overhangs the edge of the flange as shown (see Fig. 3) the bushing 1' being cut away at 30 for this purpose. Also this cutting away permits axial movement of the upsetting roll, so that the sizing and facing rolls may be moved into operative position.

The flanging operation having been completed as described, the chuck is backed off from the pipe by suitable manipulation of the hydraulic cylinder and the parts are adjusted for initiating another flanging operation. The cycle of operations is then completed and may be repeated to form any number of flanges desired.

It will be observed that by the operations described a flange of any desired thickness or height may be formed upon a pipe regardless of the thickness of the walls of the pipe, that this flange may be made of uniform thickness throughout and that the flange is homogeneous and free from undesirable metal conditions, a finished flanged pipe being shown in Fig. 3.

While the invention has been illustrated in what is considered its best embodiment, it may have other embodiments without departing from its spirit and it is not therefore limited to the structures shown in the drawings nor to the precise details of the method as recited, claims being appended to point out the invention in accordance with the patent statutes.

What I claim is:—

1. The method of forming a flanged pipe which consists in successively thickening to pre-determined desired amounts, succeeding axial sections of the pipe wall and successively moving said thickened wall sections outwardly to build up the flange.

2. The method of forming a flange upon a pipe from the metal thereof which consists in a succession of operations each of which consists in thickening the metal of the pipe to a pre-determined desired degree and moving the thickened metal outwardly.

3. The method of forming a flange upon a pipe from the metal thereof which consists in thickening the metal at the end of the pipe by exerting thereon force tending to compress the pipe axially and to turn the metal outwardly while limiting the outward movement of the metal, changing the outward limit of movement of the metal and applying the said force to thicken the metal at the end of the pipe under the changed limit of outward movement of the metal.

4. The method of forming a flange upon a pipe from the metal thereof, which consists in thickening the metal at the end of the pipe by exerting thereon a force tending to compress the pipe axially and to turn the metal outwardly while limiting the outward movement of the metal, intermittently changing the outward limit of movement of the metal and applying the said force to successively thicken suceeding sections of metal of the pipe walls under the different limits of outward movement of the metal which are intermittently and successively established.

In testimony whereof I have signed this specification this 10th day of April, 1917.

LOUIS H. BRINKMAN.

Copies of this patent may be obtained for five cents each, by addressing the "Commissioner of Patents, Washington, D. C."